C. G. BUCHANAN.
MAGNETIC PULLEY.
APPLICATION FILED MAY 4, 1920.

1,365,966.

Patented Jan. 18, 1921.

Inventor
Charles G. Buchanan
By his Attorneys
Edwards, Sager & Bower

UNITED STATES PATENT OFFICE.

CHARLES G. BUCHANAN, OF NEWARK, NEW JERSEY.

MAGNETIC PULLEY.

1,365,966.

Specification of Letters Patent.

Patented Jan. 18, 1921.

Application filed May 4, 1920. Serial No. 378,727.

*To all whom it may concern:*

Be it known that I, CHARLES G. BUCHANAN, a citizen of the United States, residing at Newark, in the county of Essex and State of New Jersey, have invented certain new and useful Improvements in Magnetic Pulleys, of which the following is a specification.

This invention relates to magnetic separation apparatus and particularly to magnetic pulleys adapted to produce a magnetic field at the surface of a conveyer belt running over the pulley. Such pulleys are used to selectively separate out magnetic portions of material carried by the belt and as installed in mining and other operations, for instance, are often required to sustain the pull of a long loaded conveyer belt under severe service conditions.

One object of this invention is to provide a magnetic pulley which will be strong and durable and which will carry the load stresses by a heavy mechanical structure without affecting the more delicate electrical coils and connections.

Another object of the invention is to provide a pulley made up of duplicate units easily manufactured and assembled into different lengths of pulleys corresponding to standard widths of belts.

Figure 1:
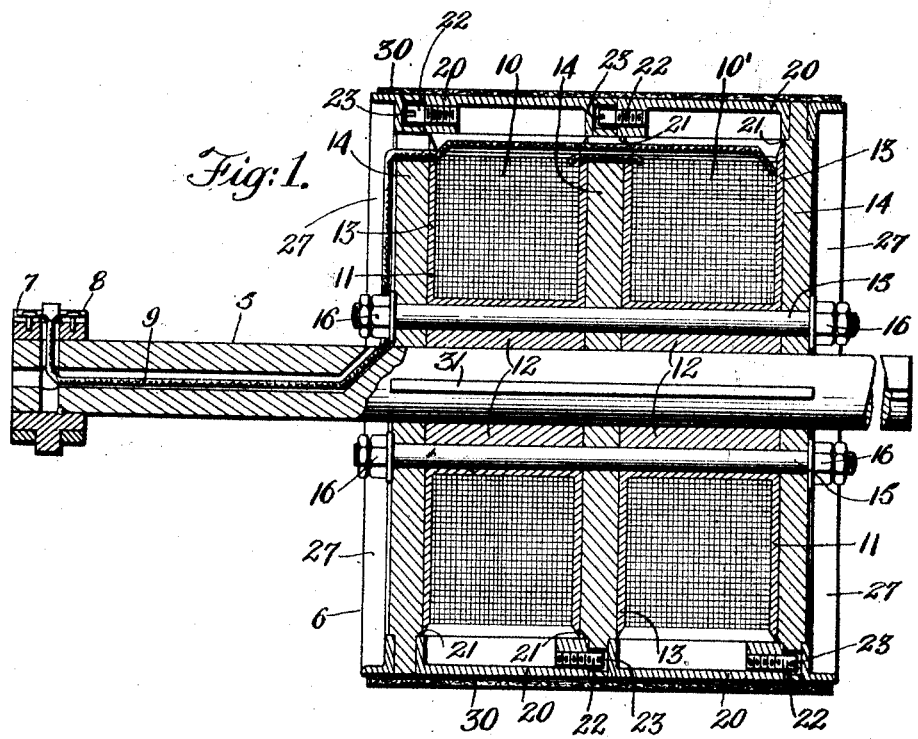
Figure 2:
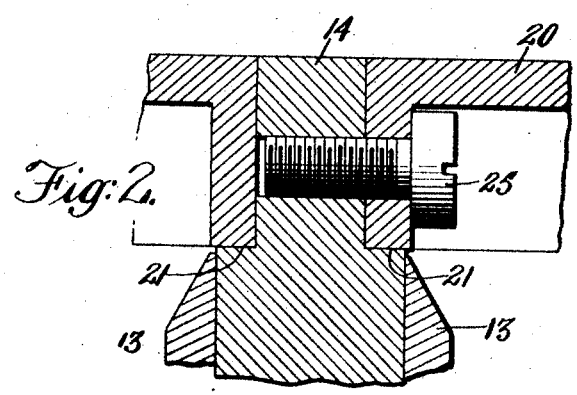

Further objects of the invention particularly in the provision of unitary spools for the windings and the supporting of all the parts directly on the pulley shaft will appear from the following specification taken in connection with the accompanying drawings, in which, Figure 1 is a sectional view of one embodiment of the invention, and Fig. 2 is a sectional view of a modified detail.

In the embodiment of the invention shown in the drawings a shaft 5 carries the magnetic pulley 6 at one portion of its length and has conductor rings 7 and 8 at one end connected by wires in cable 9 to the windings 10 and 10' of the pulley. The other end of the shaft may be extended through its bearing and have a driving pulley keyed thereon. The windings 10 and 10' are contained in spools 11 key seated directly on shaft 5. Spools 11 comprise hub portions 12 and end flanges 13 which are relatively thin, and abutting against each end of the spools 11 and intervening between these spools are the circular disks 14 also key seated directly on the shaft 5. The spools 11 and disks 14 are also rigidly fastened together by tie bolts 15 passing through alined holes in the parts and these bolts 15 are tensioned by end nuts 16 to hold the parts into firm engagement.

The disks 14 are larger in diameter than the spools 11 and are bridged across by brass spacer rings 20, the outer portions of the disks 14 on each side being turned down to provide seats 21 for the ends of said spacer rings. A clearance is provided between the inner surfaces of these spacer rings and the outer ends of the flanges 13 so that these flanges do not sustain any of the stresses or pressure on these rings.

The spacer rings 20 are held against rotation by studs 22 extending into recesses 23 in the disks 14 or these studs may be replaced by the screw bolt 25 passing through the end flange of the spacer ring and screwing into a threaded hole in the disk 14 as shown in Fig. 2. At each end of the pulley flange rings 27 may be provided fastened in place upon the end disks 14. The torsional and compression stresses of the belt 30 are sustained by the spacer rings 20 and disks 14 and transmitted by the latter directly to the shaft 5 without affecting the coil windings or the winding supporting spools. The single key 31 of the shaft 5 fitting in key ways in the disks 14 and spools 11 forms a solid unitary abutment retaining all parts of the pulley in alinement and holding them against relative turning. The tie bolts 15 also aid in holding the parts of the pulley together and the result is a very strong and durable construction.

The lines of magnetic flux pass around through one disk 14 through the adjacent hub 12 and shaft 5 out through the next disk 14 to the periphery of the pulley and thence across the air gap to the first mentioned disk 14. These magnetic disks 14 and spools or bobbins 12 have extended surfaces in tight contact making it easy for the flux to pass from one to the other and it will be noted that the disks 14 are wider at their inner portions so that the flux there is not so dense but is concentrated at the outer peripheries of the disk so as to be extended well out onto the outer surface of the belt 30.

The spools 11 and disks 14 and spacer rings 20 and flange rings 27 are all duplicates so that different lengths of pulleys for different widths of belts may be built up from a stock of standard parts simply by asssembling a correseponding number of units together. The magnetic disks 14 and the spools or bobbins 12 are of steel and the formation of all the parts requires only the vary simplest machining operations and all similar parts are easily made identical by standard jigs and templets. The bobbin or coil holder 11 does not necessarily have to be made of magnetic material but can be made of fiber or brass, either cast or spun, and cast iron could be used instead of steel without affecting the strength of the steel pole pieces or magnetic disks.

While the invention has been described in connection with a specific embodiment and a small two unit pulley has been used for illustration, it is understood that any size of pulley may be built up and that various modifications may be resorted to within the principle of the invention as set forth in the appended claims.

I claim:—

1. In a magnetic pulley the combination with a supporting shaft, of coil supporting spools mounted on and engaging said shaft, magnetic disks abutting the ends of said spools, spacer rings extending between the peripheral portions of said disks and forming therewith a belt engaging pulley surface substantially coextensive with the length of said pulley, and means for binding said parts into a rigid pulley.

2. In a magnetic pulley the combination with a supporting shaft, of a series of spaced magnetic disks on said shaft, spacer rings bridging the outer portions of said disks and supported thereby, and coil supporting spools mounted directly on said shaft independently of said disks.

CHARLES G. BUCHANAN.